(12) United States Patent
Humphrey et al.

(10) Patent No.: US 7,513,948 B1
(45) Date of Patent: *Apr. 7, 2009

(54) AUTOGENOUS HEALING OF CRACKS IN CONCRETE STRUCTURES

(75) Inventors: Eugene B. Humphrey, Hamden, CT (US); Todd B Humphrey, legal representative, Hamden, CT (US); Michael S. Rhodes, Bronx, NY (US); Philip S. Rhodes, legal representative, Bronx, NY (US); Philip S. Rhodes, Teaneck, NJ (US); James R. Humphrey, Southington, CT (US); Leonid Izrailev, Brooklyn, NY (US); David Rosenberg, Jersey City, NJ (US); John Wojakowski, Topeka, KS (US); Jason Tuerack, Jericho, NY (US)

(73) Assignee: Hycrete, Inc., Carlstadt, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/848,625

(22) Filed: Aug. 31, 2007

Related U.S. Application Data

(63) Continuation-in-part of application No. 11/590,624, filed on Oct. 31, 2006, now Pat. No. 7,407,535.

(51) Int. Cl.
C04B 24/04 (2006.01)
C04B 103/00 (2006.01)
C04B 103/61 (2006.01)
B05D 1/02 (2006.01)
B05D 1/28 (2006.01)
B05D 5/00 (2006.01)
C09D 5/08 (2006.01)
C23F 11/00 (2006.01)

(52) U.S. Cl. .................. 106/810; 106/14.13; 106/14.41; 106/14.44; 106/728; 106/823; 252/389.1; 252/389.2; 252/389.24; 252/389.31; 252/396; 427/299; 427/368; 427/384; 427/419.8; 427/421.1; 427/429

(58) Field of Classification Search ............. 106/14.13, 106/14.41, 14.44, 728, 810, 823; 252/389.1, 252/389.2, 389.24, 389.31, 396; 427/299, 427/368, 384, 419.8, 421.1, 429
See application file for complete search history.

(56) References Cited

U.S. PATENT DOCUMENTS

| 3,682,718 | A | | 8/1972 | Palm et al. | |
|---|---|---|---|---|---|
| 3,763,083 | A | | 10/1973 | Grotheer | |
| 4,869,752 | A | * | 9/1989 | Jaklin | 106/14.21 |
| 6,071,436 | A | | 6/2000 | Incorvia | |
| 6,277,450 | B1 | * | 8/2001 | Katoot et al. | 427/512 |
| 6,605,577 | B1 | | 8/2003 | Harrison et al. | |
| 7,261,923 | B2 | * | 8/2007 | Rhodes et al. | 427/384 |
| 2004/0237834 | A1 | * | 12/2004 | Humphrey et al. | 106/14.13 |
| 2004/0237835 | A1 | * | 12/2004 | Rhodes et al. | 106/14.13 |
| 2006/0096497 | A1 | | 5/2006 | Rhodes et al. | |

FOREIGN PATENT DOCUMENTS

| JP | 4-255709 | 9/1992 |
|---|---|---|
| JP | 6-115992 | 4/1994 |
| WO | 85/05066 | 11/1985 |
| WO | 97/20900 | 6/1997 |
| WO | 98/01509 | 1/1998 |
| WO | 02/043881 | 6/2002 |

OTHER PUBLICATIONS

Allyn Jr. et al, "Strength And Durability Of Concrete Containing Salts of Alkenyl-Succinic Acid", ACI Materials Journal, 98(1), pp. 52-58 (Jan.-Feb. 2001).*
Allyn Jr. et al, "Corrosion Tests With Concrete Containing Salts Of Alkenyl-Substituted Succinic Acid", ACI Materials Journal, 98(3), pp. 224-232 (May-Jun. 2001).*
Goodwin, et al., Protection of Reinforcement With Corrosion Inhibitors, Phase II, Dec. 2002, 125 pages.
Civjan, et al., Performance Evaluation and Economic Analysis of Combinations of Durability Enhancing Admixtures (Mineral and Chemical) in Structural Concrete for The Northeast U.S.A., Feb. 2003, 165 pages.

* cited by examiner

Primary Examiner—Anthony J Green
(74) Attorney, Agent, or Firm—McCarter & English, LLP

(57) ABSTRACT

Systems and methods for enhanced autogenous healing of cracks that are formed or are present in concrete-containing materials and surfaces are disclosed. Treatment modalities that include addition of the disclosed materials, compositions and systems to pre- and post-construction concrete-containing materials and surfaces are provided. Autogenous healing is effected at a greater rate and to a larger degree as compared to control systems. The disclosed compositions and systems also yield reductions in the rate and/or impact of corrosion are achieved for concrete-containing structures and surfaces and, despite the water soluble properties of the compositions and systems, the treatments are effective in delivering an advantageous level of moisture resistance to the treated concrete-containing structure and/or surface. The composition is synthesized from a feedstock that includes $C_9$ to $C_{16}$ branched hydrocarbons of varying structures.

18 Claims, 1 Drawing Sheet

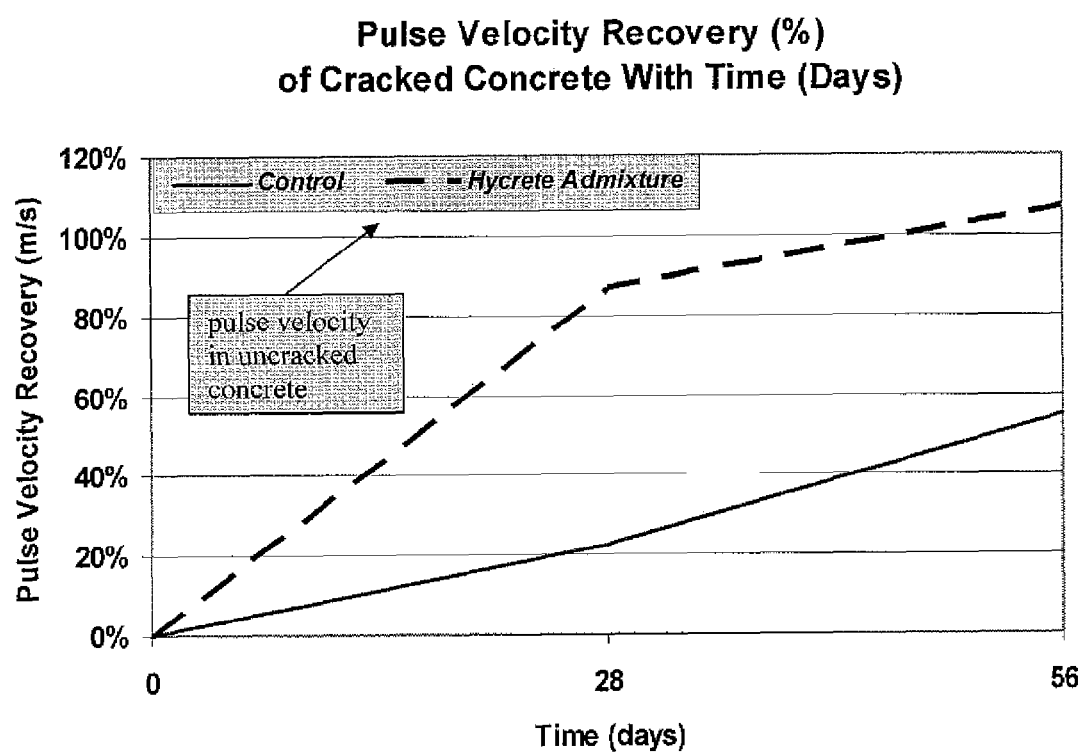

AUTOGENOUS HEALING OF CRACKS IN CONCRETE STRUCTURES

CROSS-REFERENCE TO RELATED APPLICATIONS

The present application is a continuation-in-part application that claims the benefit of a co-pending, commonly assigned non-provisional patent application entitled "Corrosion Resistant Compositions for Treatment of Concrete Structures," which was filed on Oct. 31, 2006 and assigned Ser. No. 11/590,624, now U.S. Pat. No. 7,407,525. The entire content of the foregoing non-provisional patent application is incorporated herein by reference.

BACKGROUND OF THE INVENTION

1. Technical Field

The present disclosure generally relates to advantageous systems and methods that facilitate enhanced autogenous healing of cracks in concrete structures. The disclosed systems and methods utilize water soluble materials that may be incorporated into the concrete structure at various points in time, e.g., at the pre-hardening stage, the post-hardened stage, or combinations thereof.

2. Description of Background Art

The cost of corrosion and other structural defects in materials is devastating with respect to damage and deterioration to structures as well as the potential for human injury. From a financial perspective, the cost of corrosion alone is estimated to be over $300 billion each year in the United States. The problem of preventing corrosion and addressing other potential structural defects remains a challenge confronting the construction and maintenance industries.

Commonly, structures are made of concrete materials. Because conventional concrete has very low tensile strength, it is common practice to reinforce concrete with steel bars in applications where the concrete is subjected to substantial loads. In such implementations, the concrete has at least two functions. One function is to protect the reinforcing steel bars against corrosion. Another prominent function is to improve resistance from shear and compressive stresses. As a general matter, the protective effect of hardened concrete against climatic and environmental conditions on reinforcing steel depends, for example, on the amount and type of cement, water/cement factor and concrete integrity. However, since concrete is also a permeable absorptive material, concrete is often subject to undesirable intrusion of moisture and other substances, each of which can lead to corrosion of the reinforcing steel. Moreover, concrete structures are susceptible to cracking which provides a pathway for the invasive effects of moisture and the like.

Crack formation in concrete is a known and expected phenomenon. Various causes of concrete cracking can be observed, e.g., plastic shrinkage, plastic settlement, early thermal contraction, crazing, drying shrinkage, construction movement and/or accidental overload. In one particular example, as reinforcing steel corrodes, it expands, thus cracking (and/or further cracking) the concrete, which in turn allows for more impurity invasion, e.g., water ingress, which in turn advances corrosion as the cycle builds. Moreover, as a result of various distresses, such as environmental conditions, including at least shear and compressive stresses, accumulated after some length of service, the concrete can eventually develop structurally significant cracking which can lead to failure. In short, the noted processes have the potential for effecting premature deterioration and subsequent failure of concrete structures.

Irrespective of the cause of concrete cracking, cracks are deleterious to the generally desirable moisture barrier properties of the concrete. In concrete members where waterproof properties are desired and where cracking occurs, costly post construction repairs may be necessary to seal the cracks. In conventional concrete applications, complete hydration of Portland cement occurs over a many year span. As a result, leakage of water into cracks generally results in the water molecules contacting residual unhydrated cement. To the extent residual unhydrated cement is contacted, hydration of the cement occurs and new cementitious reaction products form in the crack area, thereby bridging the cracks and partially or fully sealing the leakage. This phenomenon has been termed autogenous self-healing of the concrete.

Efforts have been made to solve the premature deterioration of such structures. For example, U.S. Pat. No. 4,869,752 to Jaklin describes the use of modified inorganic silicates, e.g., modified alkali silicates, as a concrete additive to prevent corrosion of steel structures or reinforcing steel. U.S. Pat. No. 6,277,450 to Katoot describes the use of a coating process to coat metal surfaces which are modified to an active moiety of metal hydroxide receptive to a fully cross-linked polymer of various thickness. Other processes that have been used have included precoating surfaces of metals used in the building and construction industry. However, such methods are generally costly, ineffective and inefficient/impractical.

In commonly assigned applications, materials and systems for treatment of concrete structures have been disclosed. U.S. Patent Publication No. 2004/0237834 to Humphrey et al. discloses a composition for concrete treatment and a method for synthesis thereof. The disclosed composition is an alkali-based salt solution of a dioic acid of the following chemical formula:

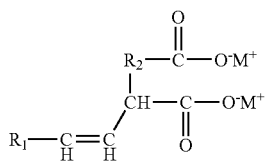

wherein M+ is selected from the group comprising Na+ and K+; $R_1$ is a $C_1$ to $C_{24}$ branch or linear aliphatic compound; and $R_2$ is a $C_1$ to $C_{10}$ branch or linear aliphatic compound.

U.S. Patent Publication No. 2004/0237835 to Rhodes et al. discloses a further concrete treatment system that includes the alkali-based salt solution of a dioic acid of the Humphrey et al. patent publication (U.S. Patent Publication No. 2004/0237834) in combination with a defoaming agent, e.g., a polyether modified polysilixane, tri-alkane/alkene phosphates and mixtures thereof. The disclosed defoaming agent is effective in reducing excessive air entrainment and/or foaming during preparation of concrete mixes and in controlling air content of the cured concrete.

Reference is also made to a pair of publications by Mark Allyn, Jr. and Gregory C. Frantz. In a first publication, Allyn, Jr., et al. describe strength and durability testing of concrete containing salts of alkenyl-succinic acid, specifically disodium tetrapropenyl succinate (DSS) and diammonium tetrapropenyl succinate (DAS). [Allyn, Jr., et al., "Strength and Durability of Concrete Containing Salts of Alkenyl-Succinic Acid," ACI Materials Journal, January-February 2001, pages 52-58]. In a second publication, Allyn, Jr., et al. describe corrosion testing of the foregoing materials over a 48 week period. [Allyn, Jr., et al., "Corrosion Tests with Concrete Containing Salts of Alkenyl-Substituted Succinic Acid," ACI Materials Journal, May-June 2001, pages 224-232.] Neither of the Allyn, Jr., et al. publications provides structural details of the disclosed composition nor teachings as to synthesis of the disclosed composition.

Despite efforts to date, a need remains for treatments, materials and processes that can reduce and/or eliminate the potential for crack-related deterioration and/or failure of concrete structures. These and other needs are advantageously satisfied by the disclosed treatment systems and methods.

SUMMARY OF THE PRESENT DISCLOSURE

According to the present disclosure, systems and methods for facilitating enhanced autogenous healing of cracks in concrete structures are provided. According to exemplary embodiments of the present disclosure, an aqueous solution of a blend or mixture of molecules/compounds is utilized to achieve enhanced autogenous healing of concrete structures. Indeed, use of the disclosed blends/mixtures has resulted in an unexpected enhancement of autogeneous self-healing in concrete systems.

The disclosed blend/mixture of water soluble materials includes molecules of the following formula:

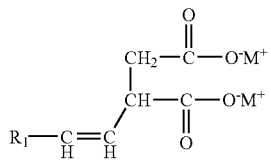

wherein $R_1$ is a $C_9$ to $C_{16}$ branched hydrocarbon and M+ is Na+ or K+. Of note, the disclosed water soluble material constitutes a mixture or blend of molecules of the above-noted formula, but the precise chemical formula of the molecules included in the mixture/blend are non-uniform. Thus, in a typical blend/mixture, a percentage of the molecules are characterized by $R_1=C_9$, a percentage of the molecules are characterized by $R_1=C_{10}$, a percentage of the molecules are characterized by $R_1=C_{11}$, etc. On a weighted basis, the average $R_1$ hydrocarbon chain length is typically in the range of $C_{12}$.

Of note, the disclosed water soluble blend/mixture includes hydrocarbon molecules featuring branched side chains of varying carbon lengths. However, all or substantially all of the branched side chains include a specified number of carbon atoms, namely between nine (9) and sixteen (16) carbon atoms. It has been found that branched side chains falling within a range of $C_9$ to $C_{16}$ (inclusive) contribute to the effectiveness of the disclosed material, composition or system in enhancing autogenous healing. The inclusion of shorter branched hydrocarbon side chains (e.g., $C_8$ and less) is generally ineffective because, when incorporated into a concrete-containing structure (whether at the mixing/formulation stage or at the post-construction stage), such smaller hydrocarbon side chains are highly likely to be washed away by permeating water, thereby failing to perform the advantageous autogeneous healing functions of the disclosed system and method. With reference to longer branched hydrocarbon side chains (e.g., $C_{17}$ and higher), it has been found that such longer chain molecules raise substantial water solubility issues. Thus, according to the present disclosure, a critical branched side chain range has been identified that advantageously achieves optimal properties and performance, as described herein.

With reference to the sodium/potassium constituents, exemplary blends/mixtures according to the present disclosure generally include molecules that include each of the alkali metal constituents. Thus, M+ for purposes of a percentage of the molecules in the disclosed blend/mixture is sodium, while M+ for purposes of a second percentage of the molecules in the disclosed blend/mixture is potassium, and M+ for a third percentage of the molecules in the disclosed blend/mixture is sodium as to one position and potassium as to the second position. In an exemplary embodiment of the present disclosure, on a molar basis, sodium constitutes about 90 to 100% and potassium constitutes about 0 to 10%.

The disclosed mixtures/blends of water soluble materials are useful in treatment modalities wherein the concrete is being mixed/formulated. The disclosed mixtures/blends of water soluble materials may also be useful in treatment modalities wherein hardened concrete structures and/or surfaces are subjected to one or more applications of an advantageous water soluble composition, material or system. The disclosed treatment modalities are believed to facilitate and/or promote autogenous healing of cracks in hardened concrete structures, particularly at or in close proximity to the surface of the hardened concrete structure(s), and in reducing the rate and/or impact of corrosion in or for a concrete-containing structure/surface. In further exemplary embodiments of the present disclosure, the disclosed mixtures/blends of water soluble materials may be applied to hardened concrete structure(s) in pressurized treatment, thereby gaining greater depth in application and providing enhanced autogenous healing in regions further removed from the surface of the hardened concrete structure(s). In addition, despite the water soluble properties of the disclosed material, composition or system, treatments involving the disclosed material, composition or system are effective in delivering an advantageous level of moisture resistance to the treated concrete-containing structure and/or surface.

In exemplary embodiments of the present disclosure, the water soluble material, composition or system may be added during cement formulation at various water-cement ratios. In alternative exemplary embodiments, the disclosed water soluble material, composition or system may be applied to a hardened concrete-containing structure or surface through various treatment techniques, e.g., by spraying, brushing or misting an effective amount of the disclosed material, composition or system onto one or more surfaces of the concrete-containing structure. The treated structure(s) advantageously demonstrate and/or effect: (i) enhanced autogenous healing of cracks that form in the hardened concrete structure; (ii) improved corrosion properties, e.g., a substantially reduced corrosion rate; and (iii) advantageous resistance to water permeation.

An advantageous technique for synthesizing the disclosed materials, compositions and systems is provided herein. Of note, the active compositions disclosed herein are water soluble and are generally stored, distributed and utilized in an aqueous form. In an exemplary implementation of the present disclosure, the active ingredient is present in the aqueous solution at a level of about 20% by weight. Despite the solubility of the active ingredients/compositions disclosed herein, such ingredients/compositions are effective to inhibit and/or prevent water penetration in situ, i.e., in cement-containing structures.

Exemplary solutions and systems of the present disclosure may further include a thinning agent and/or a carrier that is effective to reduce the viscosity of the disclosed solution/system, particularly for post-construction treatments, i.e., treatments for hardened concrete structures/surfaces. For example, a thinning agent may be incorporated into the disclosed solution/system in an amount of about 5% to about 70% by weight. The thinning agent advantageously facilitates penetration of the disclosed water soluble solution/system into the concrete-containing structure, e.g., through pores, cracks and/or fissures formed or defined in the concrete-containing structure. Exemplary thinning agents include isopropyl alcohol or a similar solvent (or combinations thereof). Of note, the disclosed thinning agents may additionally function to reduce the potential for impurity(ies) to react with the disclosed solution/system, e.g., potential reactions with Ca+ ions in the concrete-containing structures, thereby enhancing the stability and/or overall effectiveness of the disclosed solution/system.

Post-construction materials and structures that may be treated with the disclosed solutions/systems vary widely, and include structures such as reinforced or un-reinforced concrete assemblies or elements, mortar, stucco and the like. In exemplary embodiments of the present disclosure, the disclosed solution/system may be applied directly to the exterior surface of a reinforced and/or un-reinforced concrete structure and be permitted to penetrate to interior regions thereof, e.g., by capillary action.

Additional features, functionalities and beneficial results associated with the disclosed solution/system and treatment modalities associated therewith will be apparent from the detailed description which follows.

BRIEF DESCRIPTION OF THE FIGURE

To assist those of ordinary skill in the art in making and using the disclosed systems and methods, reference is made to the accompanying figure, wherein:

FIG. 1 is a plot of pulse velocity recovery vs. time for concrete systems according to the present disclosure as compared to a control system.

DETAILED DESCRIPTION OF EXEMPLARY EMBODIMENT(S)

Systems and methods for enhancing autogenous healing in concrete-containing structures are disclosed. Treatment modalities that include addition of the disclosed materials, compositions and systems to pre- and post-construction concrete-containing materials and surfaces are advantageously provided. Enhanced autogenous healing of cracks is effected through the addition of the disclosed materials, compositions and systems to concrete-containing structures. In addition, reductions in the rate and/or impact of corrosion are achieved for concrete-containing structures/surfaces and, despite the water soluble properties of the disclosed material, composition and system, the disclosed treatments are effective in delivering an advantageous level of moisture resistance to the treated concrete-containing structure and/or surface.

The water soluble material, composition or system may be added during cement formulation at various water-cement ratios. The formulation of cement mixtures is well known to persons skilled in the art, and a detailed discussion thereof will not be provided herein. It is to be noted that the disclosed materials, compositions and systems may be utilized in essentially any concrete application, and the level of treatment may generally be in the range of about 0.01% to about 0.25% by weight relative to the underlying concrete/water formulation. In particular exemplary embodiments of the present disclosure, the treatment level is in the range of about 0.04% to about 0.1% by weight relative to the underlying concrete/water formulation. The disclosed materials, compositions and systems offer beneficial results to many users including, inter alia, concrete producers, builders, designers and owners. Among the benefits afforded by the disclosed materials, compositions and systems are cost savings, schedule acceleration and sustainable construction solutions. Exemplary projects/implementations include, inter alia, deep foundation slabs and walls, podium and plaza decks, roof, parking and tunnel structures.

Beyond the enhanced autogenous healing functionality disclosed herein, the disclosed materials, compositions and systems advantageously deliver integral waterproofing that essentially eliminates the need for external membranes, coatings and sheeting treatments. With the disclosed materials, compositions and systems, concrete may be batched therewith to achieve hydrophobic performance (e.g., less than 1% absorption under the British Standard Absorption Test, BSI 1881-122). As described herein, treatment with the disclosed materials, compositions and systems advantageously transforms concrete from an open network of capillaries and cracks into a structure that exhibits ultra-low absorption characteristics, thereby effecting a desirable level of waterproofing and resultant anti-corrosive functionality. To the extent cracks form in the concrete structure, the disclosed materials, compositions and systems have been found to enhance both the speed and level of autogenous healing that occurs in concrete-containing structures/systems.

The disclosed materials, compositions and systems provide three distinct and advantageous levels of protection. First, the disclosed materials, compositions and systems protect the reinforcing steel that is frequently incorporated into concrete structures by coating the steel surface with a monomolecular film. With reference to the molecules included in the disclosed blends/mixtures, one end of each individual molecule is polar and attaches to other polar particles, such as iron or other metallic molecules. In this way, the disclosed materials, compositions and systems become bonded with respect to iron ions present at the steel surface, thereby preventing potential oxidation and associated corrosion of such surface.

Second, the disclosed materials, compositions and systems provide advantageous waterproofing properties to the concrete by reacting, in situ, with divalent metals to form long chain obstructions within concrete capillaries, fissures and other potential passages. Thus, as water (or another liquid) attempts to penetrate a treated concrete structure/surface, the disclosed materials, compositions and systems within the concrete structure/surface are solubilized, i.e., re-enter the aqueous phase, and react with divalent metals present in the penetrating liquid and/or the concrete to form long chain molecules that impede further penetration/intrusion by the water. Like oil repels water, this reaction product fills the capillaries of the concrete, repelling water and shutting down capillary absorption.

Third, the disclosed materials, compositions and systems provide advantageously enhanced autogenous healing with respect to cracks that form or otherwise exist in the concrete-containing structure/system.

As noted herein, the disclosed water soluble material, composition or system may be applied to a hardened concrete-containing structure or surface through various treatment techniques, e.g., by spraying, brushing or misting an effective amount of the disclosed material, composition or system onto one or more surfaces of the concrete-containing structure. The treated structure(s) advantageously demonstrate enhanced autogenous healing of cracks, improved corrosion properties, e.g., a substantially reduced corrosion rate, and the treated structure(s) advantageously resist water permeation.

According to the present disclosure, an aqueous solution of a blend or mixture of compounds is utilized to achieve the desired properties and functionalities. The disclosed water soluble blend/mixture includes hydrocarbon molecules featuring branched side chains of varying carbon lengths. However, all or substantially all of the branched side chains include a specified number of carbon atoms, namely between nine (9) and sixteen (16) carbon atoms. It has been found that branched side chains falling within a range of $C_9$ to $C_{16}$ (inclusive) are critical to the effectiveness of the disclosed material, composition or system. The inclusion of shorter branched hydrocarbon side chains (e.g., $C_8$ and less) is ineffective because, when incorporated into a concrete-containing structure (whether at the mixing/formulation stage or at the post-construction stage), such smaller hydrocarbon side chains are highly likely to be washed away by permeating water, thereby failing to perform the advantageous autogenous healing, anti-corrosion and moisture resistance functions of the disclosed treatment. With reference to longer branched hydrocarbon side chains (e.g., $C_{17}$ and higher), it has been found that such longer chain molecules raise substantial water solubility issues. Thus, according to the present disclosure, a critical branched side chain range has been identified that advantageously achieves optimal properties and performance.

The disclosed water soluble material, composition or system includes molecules of the following formula:

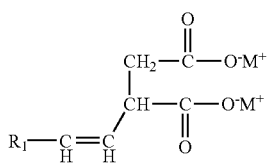

wherein $R_1$ is a $C_9$ to $C_{16}$ branched hydrocarbon and M+ is Na+ or K+. Of note, the disclosed water soluble material constitutes a mixture or blend of molecules of the above-noted formula, but the precise chemical formula of the molecules included in the mixture/blend are non-uniform. Thus, in a typical blend/mixture, a percentage of the molecules are characterized by $R_1=C_9$, a percentage of the molecules are characterized by $R_1=C_{10}$, a percentage of the molecules are characterized by $R_1=C_{11}$, etc. On a weighted basis, the average $R_1$ hydrocarbon chain length is typically in the range of $C_{12}$.

With reference to the sodium/potassium constituents, exemplary blends/mixtures according to the present disclosure generally include molecules that include each of the alkali metal constituents. Thus, M+ for purposes of a percentage of the molecules in the disclosed blend/mixture is sodium, while M+ for purposes a second percentage of the molecules in the disclosed blend/mixture is potassium, and M+ for a third percentage of the molecules in the disclosed blend/mixture is sodium as to one position and potassium as to the second position. In an exemplary embodiment of the present disclosure, on a molar basis, sodium constitutes about 90 to 95% and potassium constitutes about 5 to 10%.

An advantageous technique for synthesizing the disclosed materials, compositions and systems involves a multi-stage process. In a first stage, a feed stream is fed to a first reaction chamber. An exemplary feed stream for synthesis of the disclosed materials, compositions and systems is characterized as follows:

A mixture/blend of unsaturated branched $C_9$ to $C_{16}$ hydrocarbon molecules;

Non-homogeneous branching;

Non-homogeneous double/triple bond locations;

An overall absence of cyclic molecules; and

A weighted average of hydrocarbon chain lengths that generally corresponds to about $C_{12}$.

Feed streams satisfying the foregoing specifications may be sourced from conventional chemical supply sources, as will be apparent to persons skilled in the art.

The foregoing feed stream is generally fed to a reactor for reaction with a maleic anhydride (2,5-furandione) of general formula:

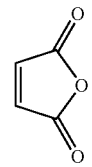

The unsaturated feed stream reacts with the maleic anhydride (in a liquified/molten form) through an addition reaction until such time as the maleic anhydride is consumed. Reaction conditions generally involve an elevated temperature of about 400° F. to about 430° F. and an elevated pressure of about 30-40 psi. The foregoing addition reaction forms an addition compound of the following formula:

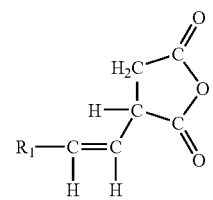

wherein $R_1$ is a $C_9$ to $C_{16}$ branched hydrocarbon.

The addition compound is generally separated from the unreacted feedstock and undesired by-products through vacuum distillation. According to exemplary processing implementations, a two pass vacuum distillation is employed (although single stage separation may be employed through appropriate separation techniques). In a first pass, unreacted feed stream constituents are flashed off at temperatures of about 350° F. In the second pass, the addition product is flashed at temperatures of about 450° F. The addition product is typically yellow in color. Residual byproducts, e.g., tars and the like, are typically discarded and/or reclaimed.

In a next reaction stage, the addition compound is generally reacted with deionized water at an elevated temperature, e.g., at or about the boiling point of water, to form a diacid. By such reaction, a diacid of general formula is formed:

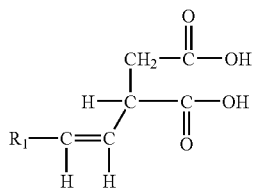

wherein $R_1$ is a $C_9$ to $C_{16}$ branched hydrocarbon. The diacid product formed by the foregoing reaction is generally a resinous solid that is soluble in water.

In the next synthesis stage, the diacid is reacted with a caustic solution that includes both sodium hydroxide and potassium hydroxide. In an exemplary embodiment, both hydroxides are supplied as aqueous solutions to a reaction chamber, e.g., at weight percentages of about 25% (with deionized water). The caustic solution generally includes sodium hydroxide at a 90 to 95 weight percentage and potassium hydroxide at a 5 to 10 weight percentage. The reaction vessel is typically closed and sufficient headroom is maintained to allow controlled pressure buildup during the reaction process. As the diacid reacts with the caustic solution, an intermediate product is generally formed of the following formula:

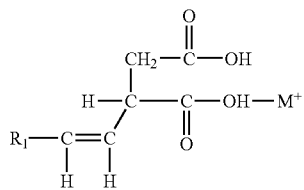

Further reaction with caustic solution yields a salt of general formula:

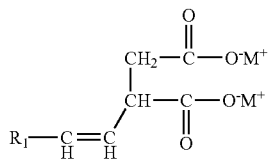

wherein $R_1$ is a $C_9$ to $C_{16}$ branched hydrocarbon and M+ is Na+ or K+ (or one of each). pH conditions within the reaction chamber are generally monitored and the reaction is complete when the pH reaches a neutral condition, thereby evidencing depletion of the caustic solution. The salt is generally soluble in water and defines the active ingredient for purposes of the disclosed material, composition and system.

According to exemplary embodiments of the present disclosure, utilization of both sodium hydroxide and potassium hydroxide has been found to be advantageous to minimize the likelihood that the active ingredient will aggregate and precipitate from an aqueous solution. The active ingredient is generally supplied as an aqueous solution, e.g., 20% by weight active ingredient (with deionized water). The interspersion of different metals has been found to significantly decrease the potential for undesirable precipitation of the active ingredient from the aqueous solution. Thus, the active materials, compositions and systems disclosed herein are water soluble and are generally stored, distributed and utilized in an aqueous form. Despite the solubility of the active ingredients/compositions disclosed herein, such ingredients/compositions are effective to inhibit and/or prevent water penetration in situ.

Exemplary solutions and systems of the present disclosure may further include a thinning agent and/or a carrier that is effective to reduce the viscosity of the disclosed solution/system, particularly for post-construction treatments, i.e., treatments for hardened concrete structures/surfaces. For example, a thinning agent may be incorporated into the disclosed solution/system in an amount of about 5% to about 70% by weight. The thinning agent advantageously facilitates penetration of the disclosed water soluble solution/system into the concrete-containing structure, e.g., through pores, cracks and/or fissures formed or defined in the concrete-containing structure. Exemplary thinning agents include isopropyl alcohol or a similar solvent (or combinations thereof). Of note, the disclosed thinning agents may additionally function to reduce the potential for impurity(ies) to react with the disclosed corrosion-inhibiting solution/system, e.g., potential reactions with Ca+ ions in the concrete-containing structures, thereby enhancing the stability and/or overall effectiveness of the disclosed solution/system.

Post-construction materials and structures that may be treated with the disclosed solutions/systems vary widely, and include structures such as reinforced or un-reinforced concrete assemblies or elements, mortar, stucco and the like. In exemplary embodiments of the present disclosure, the disclosed solution/system may be applied directly to the exterior surface of a reinforced and/or un-reinforced concrete structure and be permitted to penetrate to interior regions thereof, e.g., by capillary action.

As noted above, the additive composition provides at least three levels of protection to the treated structure/assembly. A first level of protection involves corrosion resistance protection. Thus, the solution/system is capable of migrating to a potential corrosive site and forming a monomolecular film thereon. Of note, the additive composition exhibits polarity at one molecular end thereof, thereby facilitating adherence and/or attachment with respect to oppositely charged polar/ionic substrates, for example, iron and/or other metallic molecules and the like, in the following manner:

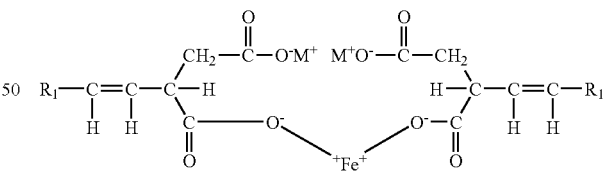

wherein $R_1$ is a $C_9$ to $C_{16}$ branched hydrocarbon and M+ is Na+ or K+.

A second level of protection is moisture resistance that arises, at least in part, from a blockage effect that is achieved by the disclosed composition/system in situ. Because the additive composition is reactive, it will tend to react with, for example, metallic or other ions in the aqueous systems that it encounters and/or metallic or other ions that it encounters in the reinforcement materials/substrates associated with the post-construction structures/assemblies. Reaction with divalent metals advantageously forms long chain molecules that effectively obstruct capillaries or other passages within the concrete-containing structure. From one or more of the noted reactions (or other reactions that may occur due to the constituents present in or on the post-construction structure/assembly), molecules/compounds having limited water solubility, e.g., precipitates, are formed that include long hydrocarbon chains. These long chain hydrocarbon chains are generally hydrophobic. The disclosed in situ reactions generally involve a divalent metal, e.g. $Ca^{+2}$, assuming an intermediate position between respective molecules of the type disclosed herein, as follows:

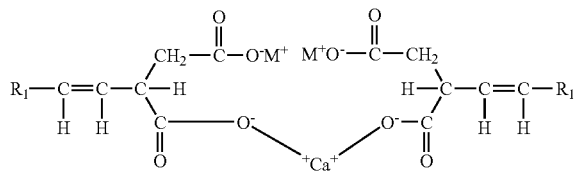

These long chain molecules can only be formed in the presence of water, since the disclosed material, composition or system must enter the aqueous phase for an ion exchange reaction of the type described herein to be initiated. Thus, upon exposure to moisture, e.g., by diffusion into a concrete capillary, the disclosed material/composition will solubilize and react with available divalent metals, e.g., $Ca^{+2}$, to form long chain molecules that impede/prevent further travel of the water molecules. The long chain molecules precipitate from the water, but form a physical barrier to further ingress of the water molecules, thereby providing advantageous waterproofing to the treated concrete structure/surface. Indeed, the precipitated materials, fill the capillaries, cracks and/or fissures of the post-construction structure/assembly, e.g., the hardened concrete substrate to which the disclosed solution/system was applied, thereby advantageously repelling water and preventing or reducing capillary absorption.

A third level of protection associated with the disclosed solutions/materials is enhanced autogenous healing of cracks that form or exist in the concrete-containing structure. The enhanced autogenous healing is reflected in both a faster rate of autogenous healing and an enhanced level of autogenous healing.

For further reference purposes and as is known by those skilled in the art, corrosion generally occurs in what may be described as an oxy-redux reaction, whereby electrons flow through the metal from the anode to the cathode. If the anode is protected, electrons from hydroxyls (OH—) are prevented from entering. Conversely, if the cathode is protected, electrons are prevented from flowing thereto.

For purposes of an electron-flow discussion, additive compositions according to the present disclosure generally protect the anode. As electrons flow, the anode develops a positive charge. The positively charged surface then attracts the strongly electronegative or hydrophilic end of the additive composition. Upon the additive composition reaching the surface, it generally bonds or attaches itself to the iron of the reinforcing steel to form a slightly soluble hydrophobic layer which protects the anode potential of the iron/reinforcing steel. With respect to exemplary embodiments of the disclosed treatment regimen wherein the post-construction material is concrete, the cured/hardened concrete generally contains water molecules in pores, cracks and/or fissures defined in the hardened concrete, such water molecules enabling the additive composition to migrate to the anodic surface of the reinforcing steel within the concrete structure. Additionally, excess additive composition generally reacts with calcium (or other impurities) to form substantially water insoluble molecules/compounds, e.g., precipitate molecules, that reduce the water permeability of the hardened concrete structure/assembly. This reduced permeability further mitigates the corrosion process and/or the potential for further corrosion of any underlying reinforcing steel.

As disclosed herein, the additive composition/system may be applied to the surface of existing concrete or mortar, i.e., a post-construction material, and generally functions to penetrate cracks in the concrete/mortar to reach reinforcing steel or other potentially corrosive materials positioned therewithin, thereby preventing corrosion of the steel while enhancing autogenous healing and reducing moisture permeability of the concrete. The additive composition may be applied by standard application methods including, for example, but not limited to, ponding or roller applied as well as high pressure and low pressure spraying applications.

In an exemplary embodiment of the present disclosure, approximately 1 gallon of the disclosed solution (20% active composition/80% water plus thinning agent at about 5% to 70% by weight) may be applied to 50 to 150 square feet of concrete surface. In other exemplary embodiments, prior to applying the disclosed solution composition to a surface, the surface may be cleaned, for example, or pressure washed to remove any existing laitance, contaminates, coatings, dirt and/or pollution. The surface may then preferably be rinsed with clean water and allowed an opportunity to dry prior to application of the additive composition. Optionally, more than one coat of the additive composition may be sequentially applied to the surface, e.g., 2 to 5 treatment applications.

To improve freeze/thaw properties, it is most effective to control air entrainment within cured concrete to about 5 to 8% with evenly spaced apart bubbles having a specific surface of from 600 to 1,100 square inches per cubic inch spaced apart by 0.004 to 0.008 inches. A defoaming agent is advantageously employed to address air entrainment. Exemplary defoaming agents include polyether modified polysiloxanes, tri-alkane/alkene phosphates and mixtures thereof. Alternative defoaming agents according to the present disclosure include ethoxylated acetylenic diols (Air Products and Chemicals, Inc.; Allentown, Pa.) and mixtures thereof. Polyether modified polysiloxanes are sold by BYK Chemie (Germany) under the trademarks BYK 025 and BYK 094. An exemplary phosphate for use as a defoaming agent according to the present disclosure is available from Akzo Nobel (Germany) under the trademark Phosflex 4 (tributyl phosphate).

According to exemplary embodiments of the present disclosure, a polyether modified polysiloxane is generally admixed in an amount from about 0.1 to 2.0% by weight, preferably about 1% by weight, relative to the disclosed water soluble materials, compositions and systems. Tri-alkane/alkene phosphates are generally admixed in an amount from about 1.0 to 8.0% by weight, preferably 5.0% by weight, relative to the disclosed water soluble materials, compositions and systems. Alternative defoaming agents may be employed, as will be readily apparent to persons skilled in the art. Additional stabilizing agents, such as benzoic acid, maleic acid and the like, may also be employed with the disclosed materials, compositions and systems.

EXAMPLE

Enhanced Autogenous Healing

Potential healing effects of the branched hydrocarbon mixture/blend disclosed herein on cracked concrete were assessed for concrete systems. A test concrete system was subjected to the disclosed branched hydrocarbon mixture at a dosage of 1 gallon per cubic yard. The control concrete system did not receive the disclosed branched hydrocarbon treatment.

A PUNDIT system (Portable Ultrasonic Non destructive Digital Indicating Tester) was employed to evaluate the extent of cracking. The PUNDIT apparatus measures the time required by an ultrasonic wave to cross a concrete specimen. The ultrasonic wave takes more time to pass through cracked concrete than uncracked concrete. PUNDIT concrete testing was performed according to ASTM C 597.

After 91 days of curing, two concrete cylinders were selected from the test and control groupings for a first series of PUNDIT tests to determine the initial value (i.e., initial time for an ultrasonic wave to pass through the sample). The concrete cylinders were then loaded until cracks were visible using a compression testing apparatus. A second series of PUNDIT measurements were then taken.

Next, the cracked cylinders were immersed in 500 mmol/l NaCl (saline) solution. PUNDIT measurements were then taken after 28 and 56 days of immersion in the saline solution.

The graphic results set forth in FIG. 1 illustrate the beneficial effect of the disclosed branched hydrocarbon mixture/blend on autogenous crack healing in concrete-containing systems. Notably, some autogeneous self-healing occurs in the control sample, but this healing does not heal the cracks to the uncracked state after 56 days. As is readily apparent from the data set forth in FIG. 1, addition of the disclosed branched hydrocarbon blend/mixture results in autogenous healing at a faster rate (as reflected in slopes of curves) and more complete level (100% healing is attained within 56 days) as compared to the control.

While the present invention has been described with respect to the exemplary embodiments thereof, it will be recognized by those of ordinary skill in the art that many modifications, enhancements, variations and/or changes can be achieved without departing from the spirit and scope of the invention. Therefore, it is manifestly intended that the invention be limited only by the scope of the claims and equivalents thereof.

The invention claimed is:

1. A method for facilitating autogenous healing of cracks in concrete-containing systems, comprising:
    (a) providing a concrete system;
    (b) adding a composition to the concrete system, the composition including an active ingredient of the formula:

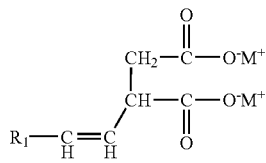

wherein $R_1$ is a $C_9$ to $C_{16}$ branched hydrocarbon and M+ is Na+, K+ or a combination thereof; and wherein the active ingredient comprises a blend or mixture of molecules having differing $R_1$ structures; and
    (c) after the composition is added to the concrete system, effecting autogenous healing of at least one crack formed in the concrete system, wherein the autogenous healing of the at least one crack is based at least in part on the presence of the composition in the concrete system.

2. The method according to claim 1, wherein the active ingredient is dissolved in an aqueous solution.

3. The method according to claim 2, wherein the aqueous solution further comprises a thinning agent in an amount of about 5% to about 70% by weight.

4. The method according to claim 3, wherein the thinning agent is selected from the group consisting of isopropyl alcohol, ethanol, xylene and combinations thereof.

5. The method according to claim 1, wherein the composition further comprises a defoaming agent.

6. The method according to claim 5, wherein the defoaming agent is selected from the group consisting of a polyether modified polysiloxane, a tri-alkane/alkene phosphate, an ethoxylated acetylenic diol, and mixtures thereof.

7. The method according to claim 1, wherein the blend or mixture of the active ingredient has a weighted average of about $C_{12}$.

8. The method according to claim 1, wherein the blend or mixture of the active ingredient includes Na+ at a level of about 90 to 100 weight percent and K+ at a level of about 0 to 10 weight percent.

9. A method for effecting enhanced autogenous healing in a concrete-containing material, comprising:
    (a) providing a composition including an active ingredient having a formula:

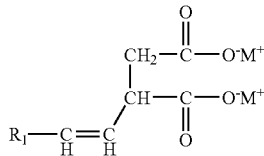

wherein $R_1$ is a $C_9$ to $C_{16}$ branched hydrocarbon and M+ is Na+, K+ or a combination thereof; and wherein the active ingredient comprises a blend or mixture of molecules having differing $R_1$ structures;
    (b) combining the composition with a concrete-containing structure or surface; and
    (c) after the composition is combined with a concrete-containing structure or surface, effecting autogenous healing of cracks formed in the concrete-containing structure or surface, wherein the autogenous healing of the cracks is at least in part based on the presence of the composition in the concrete-containing structure or surface.

10. The method according to claim 9, wherein the composition is combined with the concrete-containing structure or surface in an amount sufficient to impart waterproofing properties to the concrete-containing structure or surface.

11. The method according to claim 9, wherein the composition is combined with a concrete-water mixture during formulation of the concrete-water mixture.

12. The method according to claim 9, wherein the concrete-containing structure or surface is a post-construction structure or material; and wherein the composition is combined with the post-construction structure or material by applying the composition directly to a surface of the post-construction structure or material after the post-construction structure or material has hardened.

13. The method according to claim 12, further comprising the step of adding a thinning agent in an amount of about 5% to about 70% by weight to the composition prior to application of the composition to said surface.

14. The method according to claim 13, wherein the thinning agent is selected from the group consisting of isopropyl alcohol, ethanol, xylene and combinations thereof.

15. The method according to claim 12, wherein the post-construction material comprises existing reinforced or unreinforced concrete.

16. The method according to claim 12, further comprising a reapplication of the composition to the surface of the hardened post-construction structure or material.

17. The method according to claim 9, wherein the concrete-containing structure or surface is a post-construction structure or material; and wherein the composition is combined with the post-construction structure or material that includes at least one constituent selected from the group consisting of concrete, mortar, stucco and steel.

18. The method according to claim 9, wherein the concrete-containing structure or surface is a post-construction structure or material; and wherein the composition is combined with the post-construction structure or material by an application mechanism selected from the group consisting of spray application, brush application, mist application, pressurized application, and combinations thereof.

* * * * *